G. S. Weeks.
Paddle Wheel.
N° 8,880.  Patented Apr. 13, 1852.
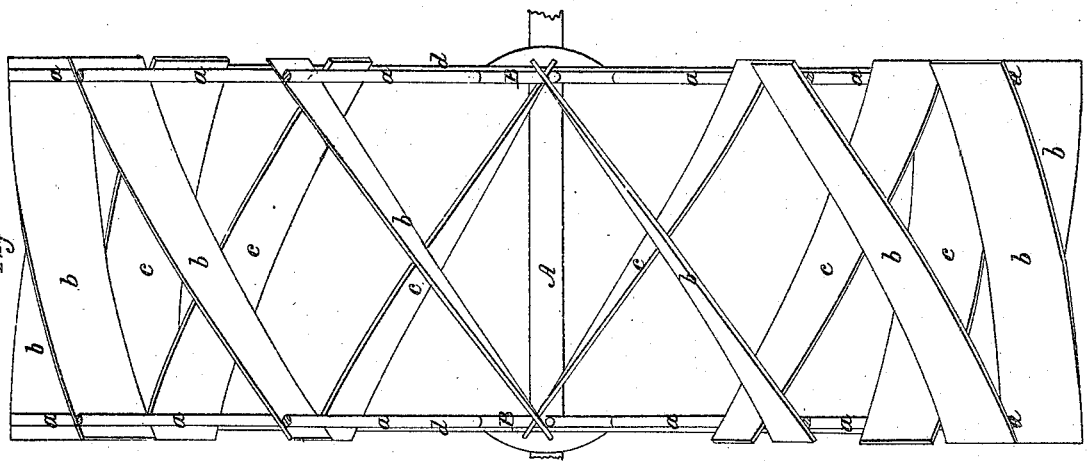
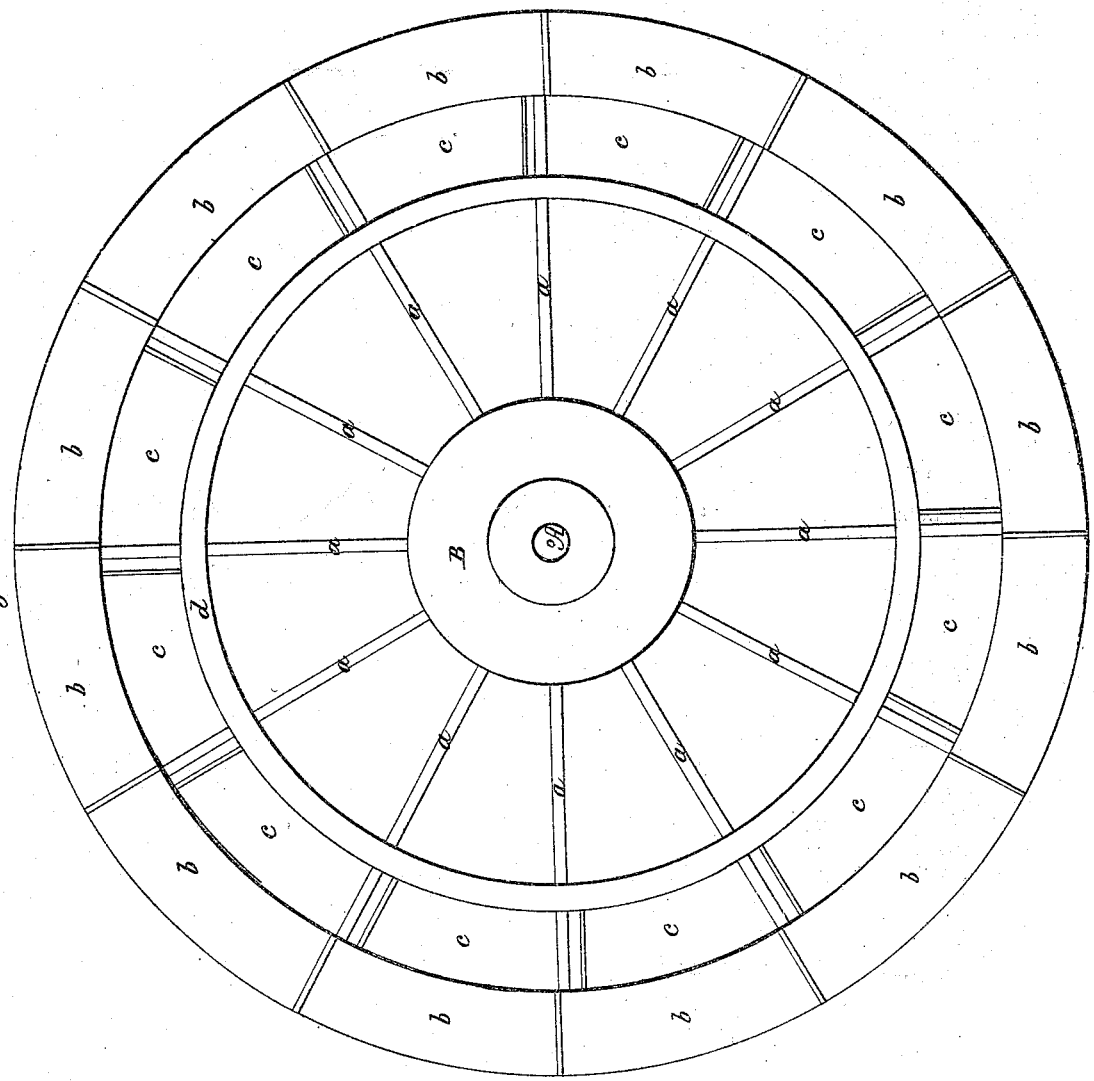

UNITED STATES PATENT OFFICE.

GEORGE S. WEEKS, OF OSWEGO, NEW YORK.

IMPROVED OBLIQUE BUCKET PADDLE-WHEEL.

Specification forming part of Letters Patent No. 8,880, dated April 13, 1852.

*To all whom it may concern:*

Be it known that I, GEORGE S. WEEKS, of Oswego, in the county of Oswego and State of New York, have invented a new and useful Improvement in Side Propelling-Wheels of Steamboats; and I do hereby declare that the following is a full and exact description thereof, reference being had to the accompanying drawings, making part of this specification, in which—

Figure 1 is a side elevation of my improved wheel, and Fig. 2 is a top view of the same, the lower half being removed.

Like letters designate like parts in both figures.

I construct the frame of my improved wheel of two series of radial arms (or spokes) $a$ $a$, &c., extending from a shaft A and strengthened by flanges B B and ties $d$ $d$ in the usual manner. To the outer extremities of said arms I attach a series of paddles $b$ $b$, &c., of suitable and uniform dimensions. Each one of said paddles is attached at one end to an arm in one series and at its other end to the arm next in order to its opposite arm in the other series of arms, thereby causing all the paddles to extend obliquely across the wheel and all to incline one way. I also attach to the arms another series of paddles $c$ $c$, &c., of about the same size as and immediately within the first series $b$ $b$, &c. Said paddles likewise extend obliquely across the wheel in precisely the same manner as the first series, but in the other direction, so as to cross the outer series. By this manner of constructing wheels the paddles enter and leave the water obliquely and gradually, and the next in order always begins to enter or leave the water before the preceding paddle has ceased to enter or leave the water, whereby the jarring of the boat caused by the common wheel, whose paddles strike the water at once their whole length, is entirely obviated; but the advantages of oblique paddles have in wheels hitherto invented been counteracted, either because they force the water from one side only to the other when the paddles have inclined all in one direction, or because they force water to the center and drag it along with the wheels or force it from the center outward when the paddles have crossed one another obliquely and equidistant from the center; but by my improved manner of constructing a certain quantity of water is caused to flow to one side by one series of paddles, while a nearly equal quantity is forced back to the other side by the other series of paddles, and these two series of currents glide past each other without interfering, because the one is above the other. I therefore obtain all the advantages of oblique paddles and also perfectly preserve the equilibrium of the water.

I do not claim placing the paddles in oblique positions to the axis of the wheel, as this has been done before, nor do I claim two sets of paddles inclining obliquely in opposite directions and all at the same distance from the center of the wheel; but What I do claim as my invention, and desire to secure by Letters Patent, is—

The arrangement of two series of adversely-inclining oblique paddles, one within the other, in the construction of steamboat-wheels, substantially as herein set forth.

The above specification of my improvement in the side propelling-wheels of steamboats signed this 16th day of February, 1851.

GEO. S. WEEKS.

Witnesses:
 Z. C. ROBBINS,
 I. W. BUTTALPH.